United States Patent Office 3,847,952
Patented Nov. 12, 1974

3,847,952
PROCESS FOR PRODUCING ALCOHOLS OF
THE FURAN SERIES
Vladimir Alexandrovich Smirnov, ul. B. Khmelnitskogo 151, kv. 21, Novocherkassk, U.S.S.R.; Vladimir Grigorievich Kulnevich, ulitsa Sadovaya 214, kv. 2; and Galina Nikolaevna Soltovets, 4 proezd Krupskoi 4, kv. 51, both of Krasnodar, U.S.S.R.; and Dmitry Platonovich Semchenko, ulitsa B. Khmelnitskogo 147, Novocherkassk, U.S.S.R.
No Drawing. Continuation of abandoned application Ser. No. 777,194, Nov. 19, 1968. This application June 28, 1971, Ser. No. 157,608
Int. Cl. C07d 5/20
U.S. Cl. 260—347.8       7 Claims

ABSTRACT OF THE DISCLOSURE

Alcohols of the furan series are prepared by reacting an aldehyde of the furan series with an alkali metal amalgam in the presence of carbon dioxide to neutralize the formed alkali metal hydroxide.

---

This application is a streamlined continuation under the Commission's Order 824 of O.G. 1 of Ser. No. 777,194, filed Nov. 19, 1968, and now abandoned.

The present invention relates to processes for the production of alcohols. More particularly, the invention relates to a process for producing alcohols of the furan series, specifically furfuryl alcohol, 2,5-di-hydroxyethylfuran and other 5-substituted furan alcohols used for the production of condensation resins of diverse application, polyesters, physiologically active substances, high quality anticorrosive coatings, cements, putties and special plastic concretes resistant to water, petrol and heat, and likewise employed as solvents and as additives for synthetic rubber and motor fuels.

Processes are known for the production of furfuryl alcohol by the catalytic hydrogenation of furfural. Methods are also known for obtaining 5-methylfurfuryl alcohol and 2,5-di-(hydroxymethyl)-furan by multistage synthesis on the basis of esters of furan-2-carboxylic acid.

However, the catalytic process of producing furfuryl alcohol requires the use of highly purified furfural and hydrogen and expensive high-pressure apparatus, as well as installations for generating hydrogen and regenerating the catalyst, which are serious disadvantages.

Disadvantages of the known methods of synthesizing 5-methyl-furfuryl alcohol and 2,5-di-(hydroxymethyl)-furan are their labour-consuming and multistage character which limit their application to preparatory purposes.

It is an object of the present invention to eliminate the above disadvantages.

It is a further and more specific object of the invention to provide a simple and efficient process for the production of alcohols of the furan series in high yield and with a high degree of purity.

According to the present invention, aldehydes of the furan series in aqueous or aqueous-alcoholic solution are run onto amalgams of alkali metals of 0.1–3.0 N concentration at a rate providing decomposition of the amalgam from 800 to 3000 a./m.$^2$ (i.e. amperes/square meter), while passing carbon dioxide through the solution to neutralize the alkali formed through decomposition of the amalgam. When the foregoing conditions are observed aldehydes are reduced to the corresponding alcohols.

For the production of furfuryl alcohol, hydrolysates obtained by processing pentosan-containing raw material may be used as the aldehyde solution, as well as solutions of furfural.

For the production of 2,5-di-(hydroxymethyl)-furan it is possible to use dehydrated hexose hydrolysates and also solutions of 5-hydroxymethylfurfural.

For the production of 5-methylfurfuryl alcohol and 5-halogen-substituted furfuryl alcohols, the initial aldehydes are 5-methylfurfural and 5-halogen-substituted furfurals, respectively.

An organic or inorganic acid of from 2 to 5% concentration is preferably added to the aldehyde solution before said aldehyde is run onto the amalgam, and the reduction reaction carried out with sodium amalgam of 1.5–2.0 N concentration.

In one version of the present process for the production of alcohols of the furan series the aqueous-alcoholic aldehyde solution contains up to 25% of an aliphatic alcohol having from 1 to 3 atoms of carbon in its molecule.

In another version of said process the aqueous-alcoholic aldehyde solution contains up to 80% of the alcohol of the furan series which is the final product of the given reduction reaction.

The process is carried out in a reaction vessel fitted with a mechanical mixer for mixing the amalgam and the solution being reduced and with a bubbler for blowing carbon dioxide through the solution. Amalgam of an alkali metal is charged into the reaction vessel and a solution of aldehyde is run into the amalgam from a burette at a constant rate, the solution being constantly stirred and saturated with carbon dioxide which is blown through it. The preset temperature is maintained by placing the reaction vessel on a water bath. When the reaction is completed the reduced solution containing the final product—an alcohol of the furan series—is poured off the amalgam and the final product isolated by a conventional method, for example, by extracting with an organic solvent such as ether or ethyl acetate, drying the extract with sodium sulfate, distilling off the solvent on a water bath and distilling the final product in vacuo.

Advantages of the present process are its simplicity, the high yield and the purity of the final product. Application of the present invention precludes the formation of by-products other than alcohols. The high selectivity of the process provides practically 100% reduction of aldehydes of the furan series and a theoretical yield of final product of 90–98%. The process is carried out without the use of hydrogen or catalyst, which substantially simplifies the production of alcohols of the furan series. The use of furfural-containing hydrolysates as starting material for the production of furfuryl alcohol makes it unnecessary to recover the furfural from the hydrolysate and purify it before reduction—an indispensable operation when producing furfuryl alcohol by the catalytic process. Another important advantage of the present invention is the use of amalgams of alkali metals, particularly the amalgam of sodium which is obtained in great amounts by a by-product in the production of chlorine and caustic in electrolysers with mercury cathodes.

For a better understanding of the present invention by those skilled in the art the following examples are given by way of illustration.

Example 1

Into a reaction vessel are placed 0.3 liter of sodium amalgam of 2.05 N initial concentration having a surface of 135 cm.$^2$ in the vessel. Onto the amalgam 0.5 liter of hydrolysate obtained by processing pentosan-containing raw material is run at a constant rate of 18 ml./min. which provides decomposition of the amalgam of 2600 a./m.$^2$. The hydrolysate contains 2.03% furfural (10.15 g.). The temperature is maintained at 19° C.

The amalgam and the solution over it are stirred continuously with a mechanical stirrer at a rate of 180 r.p.m. Carbon dioxide is blown through the solution at a rate of 40 l./hr. The furfural in the hydrolysate is reduced to furfuryl alcohol. The reduced solution is poured off the amalgam and the furfuryl alcohol content is determined by the spectrophotometric method, being found to equal 2.03%. The furfuryl alcohol is extracted from the solution with five 50 ml. portions of ether. The combined ether extract is dried over anhydrous sodium sulfate, after which the ether is distilled off at atmospheric pressure on the water bath and the residue distilled in vacuo. There are obtained 9.88 g. of furfuryl alcohol corresponding to a theoretical yield of 95.5%. Constants of furfuryl alcohol: $n_D^{20}$ 1.4868; $d_{26}^{20}$ 1.3327; b.p. 56.8±0.2° C./5 mm. Hg.

The ultraviolet spectrum of an aqueous solution of furfuryl alcohol has maximum absorption at 217 m$\mu$.

Example 2

Into a reaction vessel are placed 0.3 liter of sodium amalgam of 2.36 N initial concentration having a surface of 135 cm.$^2$ in the vessel. Onto the amalgam 0.2 liter of dehydrated hexose hydrolysate containing 1.34% of 5-hydroxymethylfurfural is run at a rate of 16 ml./min. which provides decomposition of the amalgam of 2350 a./m.$^2$. The temperature is maintained at 18° C. The stirrer is run at 160 r.p.m. Carbon dioxide is blown through the solution at a rate of 45 l./hr. The reduced solution is poured off the amalgam and the excess water distilled off *in vacuo*. 2,5-di-(hydroxymethyl)-furan is extracted from the residue with four 30 ml. portions of ethyl acetate. The combined extracts is dried over anhydrous sodium sulfate and the solvent distilled off on the water bath.

There are obtained 2.47 g. of 2,5-di-(hydroxymethyl)-furan; m.p. 80° C.; mol. wt. 128.13 (determined cryoscopically). The ultraviolet spectrum of the aqueous solution has maximum absorption at 224 m$\mu$.

Example 3

Into a reaction vessel are placed 0.3 l. of sodium amalgam of 1.48 N concentration. From furfural having the constants $d_{25}^{20}=1.1562$ and $n_D^{25}=1.5234$ is prepared 0.5 l. of an aqueous solution containing 10 g. of furfural and 15 ml. of glacial acetic acid. The solution is run onto the amalgam at a rate of 15 ml./min. which provides decomposition of the amalgam of 2780 a./m.$^2$. The stirrer is run at 180 r.p.m. The temperature is maintained at 20° C. Carbon dioxide is blown through the solution at a rate of 40 l./hr. The final product is isolated by extracting the reduced solution with six 50 ml. portions of ether, drying the combined extract over sodium sulfate, distilling off the solvent on the water bath under atmospheric pressure and distilling the residue *in vacuo*.

There are obtained 8.48 g. of furfuryl alcohol; b.p. 56.8±0.2° C./5 mm. Hg; $n_D^{20}$ 1.4870; $d_{20}^{20}$ 1.3380.

Example 4

The process is carried out as in Example 2 but the aldehyde solution is a 3.34% aqueous solution of 5-hydroxymethylfurfural containing 6.98 g. of the said aldehyde. There are obtained 6.30 g. of 2,5-di-(hydroxymethyl)-furan.

Example 5

The process is carried out as in Example 3 but the aldehyde solution is an aqueous solution of 5-methylfurfural containing 2.75 g. of the said aldehyde. The aldehyde solution is run onto the amalgam at a rate of 10 ml./min. There are obtained 2.58 g. of 5-methylfurfuryl alcohol; b.p. 79° C./12 mm. Hg.

Example 6

The process is carried out as in Example 3 but the aldehyde solution is an aqueous-alcoholic solution of 5-bromofurfural containing 20% methanol. The solution, which contains 3.84 g. of said aldehyde, is run onto the amalgam at the rate of 20 ml./min. There are obtained 3.56 g. of 5-bromofurfuryl alcohol.

Example 7

The process is carried out as in Example 3 but the aldehyde solution is an aqueous-alcoholic solution of 5-chlorofurfural containing 25% ethyl alcohol. The solution, which contains 7.79 g. of said aldehyde, is run onto the amalgam at a rate of 22 ml./min. There are obtained 7.61 g. of 5-chlorofurfuryl alcohol.

Example 8

The process is carried out as in Example 3 but the aldehyde solution is an aqueous-alcoholic solution containing 30% of furfuryl alcohol. The solution, which contains 14.52 g. of furfural 150 ml. of furfuryl alcohol, 10 ml. of glacial acetic acid and 340 ml. of water, is run onto the amalgam at a rate of 12 ml./min. There are obtained 178.16 g. of furfuryl alcohol.

What is claimed is:

1. A method of producing an alcohol of the furan series having the formula:

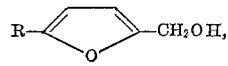

wherein R is H, $CH_3$, $CH_2OH$, Cl or Br, said method comprising feeding an aqueous solution of an aldehyde of the furan series having the formula:

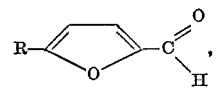

wherein R is defined above and containing from 2 to 5% by wt. of an inorganic or organic acid onto an amalgam of an alkali metal of 0.1–3.0 N concentration at a rate providing decomposition of the amalgam of from 800 to 3000 a./m.$^2$ while saturating the aldehyde solution with carbon dioxide to neutralize alkali developed during amalgam decomposition.

2. A method as claimed in claim 1 wherein the aldehyde solution has an aldehyde concentration of up to 5% by wt.

3. A method as claimed in claim 1, wherein the aldehyde solution contains up to 25% by wt. of an aliphatic alcohol having 1 to 3 carbon atoms.

4. A method as claimed in claim 1, wherein the aqueous aldehyde solution is constituted by an aqueous solution of furfural comprising up to 80% by wt. of furyl alcohol.

5. A method as claimed in claim 1, wherein the amalgam is sodium amalgam of 1.5–2.0 N concentration.

6. A method as claimed in claim 1, wherein the aldehyde solution is a hydrolysate produced by processing a pentasan-containing raw-material.

7. A method as claimed in claim 1, wherein the aldehyde solution is a dehydrated hexose hydrolysate.

References Cited

Soltovets, Smirnov, Kulnevich, Elektrokhimiya 1968, vol. 4(6), pp. 688–93; Chem. Abstract 1968, vol. 69, 82895g provided.

Smirnov, Tushnalobova and Semchenko, Khims. Geterotsikl, Suedin 1968, vol. 4 (4), pp. 585–7; Chem. Abst. 1969, vol. 70, 37582n provided.

HENRY R. JILES, Primary Examiner

B. DENTZ, Assistant Examiner